(12) United States Patent
Kim et al.

(10) Patent No.: US 8,041,223 B2
(45) Date of Patent: Oct. 18, 2011

(54) METHOD AND APPARATUS FOR ESTABLISHING SYSTEM DELAY TIME AND FRAME LENGTH IN TIME DIVISION DUPLEXING SYSTEM

(75) Inventors: Hoon Kim, Suwon-si (KR); Jae-Hun Cho, Suwon-si (KR); Seong-Taek Hwang, Pyeongtaek-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 760 days.

(21) Appl. No.: 12/057,580

(22) Filed: Mar. 28, 2008

(65) Prior Publication Data
US 2008/0240719 A1    Oct. 2, 2008

(30) Foreign Application Priority Data
Mar. 28, 2007    (KR) .................. 10-2007-0030432

(51) Int. Cl.
*H04B 10/10*    (2006.01)
*H04J 14/08*    (2006.01)
(52) U.S. Cl. .................. 398/115; 398/102; 398/103
(58) Field of Classification Search .......... 398/115–117, 398/98–102, 103
See application file for complete search history.

(56) References Cited

U.S. PATENT DOCUMENTS

| 6,122,083 | A  | * | 9/2000  | Ohta et al. ............... 398/1 |
| 7,826,430 | B2 | * | 11/2010 | Lee et al. ............... 370/337 |
| 2008/0145457 | A1 | * | 6/2008  | McNeff et al. ........... 424/729 |
| 2008/0159743 | A1 | * | 7/2008  | Lee et al. ............... 398/96 |

FOREIGN PATENT DOCUMENTS

| KR | 2002-66442 | 8/2002 |
| KR | 2006-10963 | 2/2006 |
| KR | 2006-36656 | 5/2006 |
| KR | 2006-38685 | 5/2006 |

* cited by examiner

*Primary Examiner* — Leslie Pascal
(74) *Attorney, Agent, or Firm* — Cha & Reiter, LLC

(57) ABSTRACT

A method of establishing a system delay time and a frame length in a Time Division Duplexing (TDD) system includes adjusting time lengths of an uplink (UL) frame, a downlink (DL) frame, a Transmit/receive Transition Gap (TTG), and a Receive/transmit Transition Gap (RTG); a Base Station (BS) transmitting a DL frame and receiving a UL frame; and a Mobile Station (MS) receiving the DL frame and transmitting the UL frame.

15 Claims, 4 Drawing Sheets

METHOD AND APPARATUS FOR ESTABLISHING SYSTEM DELAY TIME AND FRAME LENGTH IN TIME DIVISION DUPLEXING SYSTEM

CLAIM OF PRIORITY

This application claims the benefit of the earlier filing date, pursuant to 35 U.S.C. §119(a), to that patent application filed in the Korean Intellectual Property Office on Mar. 28, 2007 and assigned Serial No. 2007-30432, the contents of which are incorporated herein by reference.

BACKGROUND OF THE INVENTION

1. Field of the Invention

The present invention relates to a Time Division Duplexing (TDD)-based wireless communication system, and in particular, to a method of establishing a TDD time frame.

2. Description of the Related Art

In a mobile communication system repeaters are used to extend cell coverage of the system. In particular, in the case of a basement or the inside of a building in which electronic wave propagation is limited or non-existent, optical repeaters using an optical link are widely used. The optical link is used to transmit a wireless signal through an optical repeater and also used to transmit a wireless signal to an antenna far from a base station. The optical repeaters are configured and used for transmitting a wireless signal of Code Division Multiple Access (CDMA) or Wideband CDMA (WCDMA) corresponding to current mobile communication systems.

Mobile communication systems use a Frequency Division Duplexing (FDD) method using different frequencies and a Time Division Duplexing (TDD) method using different times as a duplexing method for distinguishing an uplink (UL) from a downlink (DL) for transmission of a wireless signal.

CDMA and WCDMA mainly use the FDD method, and the TDD method is discussed for Wireless Broadband Internet (WiBro) and $4^{th}$ Generation Mobile Communication (4G), which correspond to new type mobile communication systems.

According to characteristics of the TDD method, as Uplink (UL) and Downlink (DL) data amounts vary and a channel characteristic of a UL Radio Frequency (RF) signal is the same as that of a DL RF signal, it is considered that the TDD method is suitable for next generation mobile communication systems in which multiple antennas are used. In addition, the TDD method is different from the FDD method in that UL data is transmitted at a predetermined time while DL data is transmitted at the other time.

FIG. 1 is a schematic configuration of a conventional TDD system in which a time delay occurs. In FIG. 1, it is assumed that a wireless base station system time delay occurs as a Base Station (BS) is separated from a Relay Station (RS). The BS and the RS may be connected to each other in a wireless manner or through a wired transmission medium such as an optical fiber. In the case where the BS and the RS are connected to each other in a wired manner, a time delay between the BS and the RS may be referred to as $t_{fiber}$ and the time delay of the BS in processing the data may be referred to as $t_{bs}$. Thus, time taken for data generated by the BS be emitted from an antenna of the RS may be referred to as t_fix, and represented as $t\_fix = t_{fiber} + t_{bs}$.

When the wireless base station system transmits wireless data in the TDD method, a signaling diagram is illustrated in FIG. 2.

FIG. 2 illustrates a typical signaling diagram of UL and DL signals in a BS and an RS in a time axis. In FIG. 2, a duration time of a DL is defined as t_DL, and DL data having the duration time of t_DL is emitted from an antenna of the RS after time t_fix after generation in the BS. Assuming the time delay between the RS and a Mobile Station (MS) is negligible (i.e., a distance between the RS and the MS is short enough to neglect the time delay between the RS and the MS), the MS receives the DL data a time t_fix after the DL data is generated by the BS.

As the MS transmits UL data after receiving the DL data, the MS transmits $UL^1$ data after receiving $DL^1$ data as illustrated in FIG. 2. As illustrated in FIG. 2 the MS has a Transmit/receive Transition Cap (TTG), that represents a time delay from reception of DL data to transmission of corresponding UL data. UL data generated by the MS arrives at the BS after the time delay of t_fix.

Thus, in this wireless BS system, the BS receives UL data a time (t_fix+t_fix+t_DL+TTG) after transmitting DL data.

In the typical wireless BS system, if $t_{fiber}$ or t_fix is large, because the distance between the RS and the BS is large, a time delay taken from transmission of DL data to reception of UL data is significantly large, a decrease of capacity of the wireless BS system is noticed. When efficiency of a TDD wireless system is defined as a ratio of the sum of a DL data duration time and a UL data duration time to a total time, the efficiency can be represented by Equation 1.

$$\text{Efficiency} = (t\_UL + t\_DL)/(t\_fix + t\_fix + t\_DL + t\_UL + TTG) \quad (1)$$

In order to increase the efficiency of a TDD wireless system, which is represented by Equation 1, the time of t_UL or t_DL must be very long, or the time of t_fix must be very short. However, since t_UL is not sufficiently long compared to t_fix in many wireless BS systems, TDD wireless system efficiency decreases due to a time delay of each of a BS and an RS.

SUMMARY OF THE INVENTION

An aspect of the present invention is to provide a method and apparatus for increasing TDD wireless system efficiency in a wireless BS system in which t_UL or t_DL is not sufficiently long compared to t_fix.

According to one aspect of the present invention, there is provided a method for establishing a system delay time and a frame length in a Time Division Duplexing (TDD) system, the method comprising adjusting time lengths of an uplink (UL) frame, a downlink (DL) frame, a Transmit/receive Transition Gap (TTG), and a Receive/transmit Transition Gap (RTG), a Base Station (BS) transmitting a DL frame and receiving a UL frame and a Mobile Station (MS) receiving the DL frame and transmitting the UL frame.

According to another aspect of the present invention, there is provided an apparatus for establishing a system delay time and a frame length in a Time Division Duplexing (TDD) system, the apparatus comprising a main donor for generating control information, which is to be used to generate a switch control signal, using a switch control frame unit when data is transmitted from an Access Point (AP) and transmitting the control information to a remote during an idle time excluding a transmission time of downlink (DL) data and the remote for analyzing the control information received from the main donor, generating a switch control signal according to the analyzed control information, setting a link path according to the switch control signal, and outputting uplink (UL) and DL data.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE INVENTION

Embodiments of the present invention will be described herein with reference to the accompanying drawings. It will be understood by those skilled in the art that specific factors, such as detail components, described herein below are provided only to help the general understanding of the present invention and various changes in form and details may be made without departing from the spirit and scope of the invention.

When a Mobile Station (MS) is in a coverage area of a Base Station (BS), the MS receives data directly from the BS, and when the MS is not in the coverage area of the BS, the MS receives data from the BS via a Relay Station (RS). When the BS transmits data to the RS, if a transmission distance between the BS and the RS is large, a time delay taken from transmitting a downlink signal (DL) to receiving an uplink (UL) signal is correspondingly long, resulting in a decrease of efficiency of a TDD wireless system. Thus, in a TDD wireless system network suggested in the present invention in order to solve the problems of the prior art, a new configuration for increasing the TDD wireless system efficiency by additionally transmitting and receiving a signal during an idle time before a BS receives a UL signal after transmitting a DL signal is suggested. An internal configuration of a TDD optical repeater used to control UL data and DL data transmitted via an RS in a BS will now be described.

Figure 3:
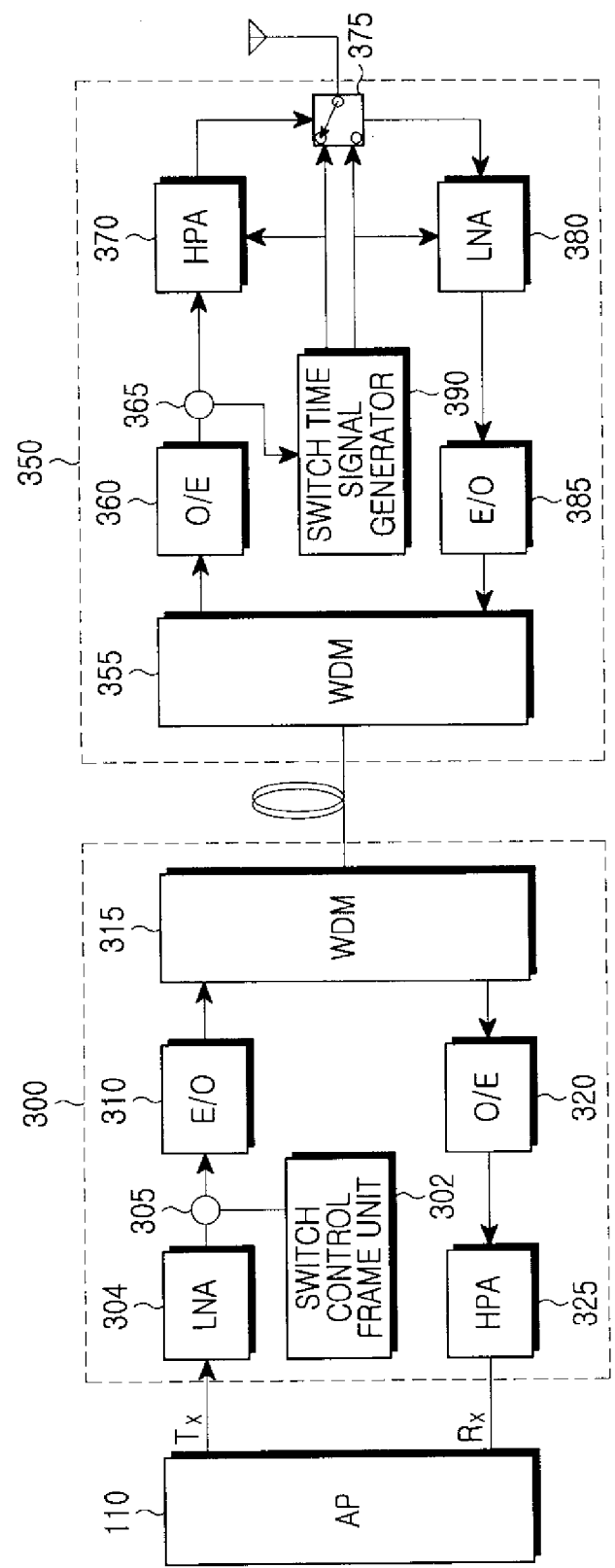
FIG. 3 is a block diagram of a TDD optical repeater according to an exemplary embodiment of the present invention.

FIG. 3 is a block diagram of a TDD optical repeater system according to an exemplary embodiment of the present invention. Referring to FIG. 3, the TDD optical repeater system includes an Access Point (AP) 110, a main donor 300, and at least one remote 350. The AP 110 and the main donor 300 correspond to a BS, and the remote 350 corresponds to an RS.

The main donor 300 of the TDD optical repeater is connected to the AP 110 through a transmission line. If DL data is received from the APT 110, the main donor 300 converts the DL data to an optical signal by means of electro-optic conversion and transmits the optical signal to the remote 350 via an optical communication cable. The main donor further converts an optical signal received from the remote 350 to UL data by means of opto-electric conversion and transmits the UL data to the AP 110 via the transmission line.

When an optical signal is received from the main donor 300, the remote 350 of the TDD optical repeater converts the optical signal to DL data by means of electro-optic conversion and transmits the DL data to a Mobile Station (MS) via an antenna. The remote 350 further converts UL data received from the MS to an optical signal by means of opto-electric conversion and transmits the optical signal to the main donor 300 via the optical communication cable.

The main donor 300 includes a switch control frame unit 302, a Low Noise Amplifier (LNA) 304, a signal combiner 305, an electro-optic conversion module (E/O) 310, a Wavelength Division Multiplexer (WDM) 315, an opto-electric conversion module (O/E) 320, and a High Power Amplifier (HPA) 325 as internal components.

The remote 350 can include a WDM 355, an O/E 360, a data separator 365, an HPA 370, a switch 375, an LNA 380, an E/O 385, and a switch time signal generator 390 as internal components.

The main donor 300 of the TDD optical repeater can expand coverage of the TDD optical repeater by connecting to a plurality of remotes 350 via optical lines. A process of transmitting a signal in UL and DL data directions will now be described in detail using the components of the TDD optical repeater.

The main donor 300 transmits DL data received from the AP 110 to the LNA 304, and the LNA 304 transmits the DL data to the signal combiner 305 after reducing a noise component and amplifying a signal component from the DL data.

The switch control frame unit 302 generates a control frame including synchronization information, time delay information, DL data transport time information, UL data transport time information, Transmit/receive Transition Gap (TTG) information, and Receive/transmit Transition Gap (RTG) information and transmits the control frame to the remote 350 during an idle time of DL data, i.e. while a UL signal is transmitted after the DL data is transmitted from the AP 110. Here, unlike DL data, the control frame is transmitted as digital data.

The signal combiner 305 combines the DL data amplified by the LNA 304 and the control frame generated by the switch control frame unit 302 and transmits the combined DL signal to the E/O 310. The E/O 310 converts the DL signal to an optical signal by means of electro-optic conversion and transmits the optical signal to the WDM 315. The WDM 315 transmits a plurality of optical signals received from the E/O 310 to the remote 350 via an optical fiber.

Each of the WDMs 315 and 355 is a device for using an optical fiber channel as a plurality of communication paths by dividing the optical fiber channel into a plurality of channels based on a wavelength of light. When an optical signal is transmitted, each of the WDMs 315 and 355 operates as a wavelength division multiplexer for transmitting various optical wavelength signals through a single optical fiber. When an optical signal is received, each of the WDMs 315 and 355 operates as a wavelength division multiplexer/demultiplexer for separating various optical wavelength signals carried on the optical fiber. Each of the E/Os 310 and 385 can be implemented using a laser diode and each of the O/Es 320 and 360 can be implemented using a photo diode.

The WDM 355 of the remote 350 separates a plurality of received optical signals and transmits an optical signal to the O/E 360, and the O/E 360 converts the optical signal to a DL signal by means of opto-electric conversion and transmits the DL signal to the data separator 365.

The data separator 365 separates DL data and a control frame from the signal received from the O/E 360 and transmits the separated control frame to the switch time signal generator 390 and the separated DL data to the HPA 370.

When the data separator 365 separates the DL data and the control frame transmitted from the switch control frame unit 302, the switch time signal generator 390 distinguishes the DL data and UL data, analyzes the control frame, and generates a switch control signal according to the information.

The HPA 370 amplifies the DL data up to effective power for wireless transmission and transmits the DL data to the switch 375. The switch 375 emits the DL data to an MS via an antenna.

The switch 375 performs a switching operation (on, off) by distinguishing UL data from DL data by a switch control signal generated by the switch time signal generator 390 and selectively sets a path of each signal.

When the remote 350 receives a UL signal from the MS via the antenna, the LNA 380 cancels noise and amplifies a signal component from the UL signal, and transmits the UL signal to the E/O 385. The E/O 385 converts the UL signal to an optical signal by means of electro-optic conversion and transmits the optical signal to the WDM 355. The WDM 355 transmits the optical signal received from the E/O 385 to the main donor 300 via the optical fiber.

The WDM 315 of the main donor 300 separates a plurality of received optical signals and transmits an optical signal to the O/E 320. The O/E 320 converts the optical signal to UL data by means of opto-electric conversion and transmits the UL data to the HPA 325. The HPA 325 amplifies the UL data up to effective power for transmitting the UL data to the AP 110 and transmits the UL data to the AP 110 via the transmission line.

Figure 1:
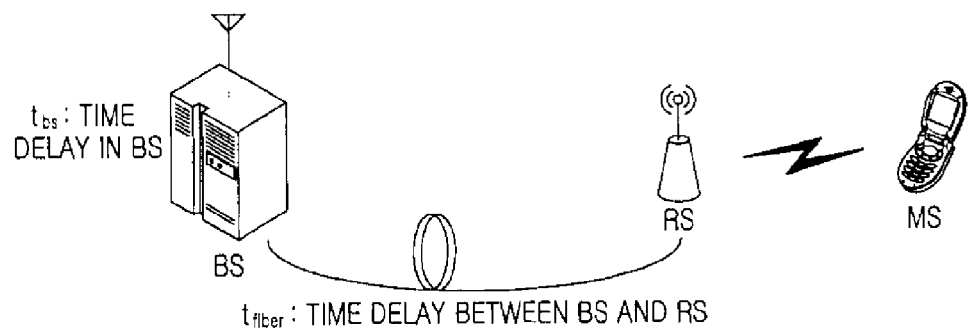
FIG. 1 is a schematic configuration of a conventional Time Division Duplexing (TDD) system in which a time delay occurs.
Figure 2:
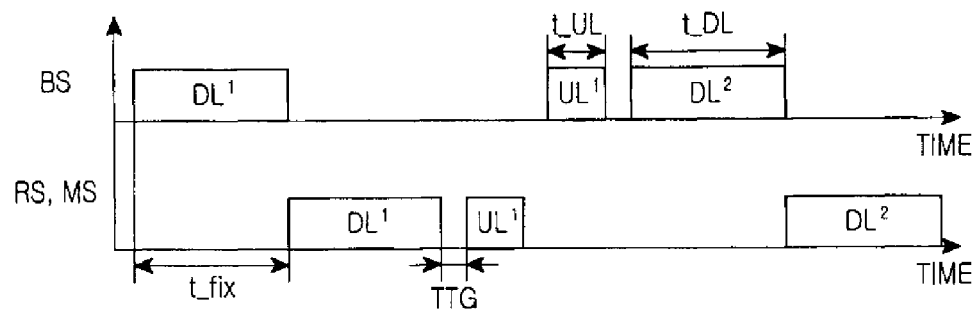
FIG. 2 illustrates a typical time axis signaling diagram of uplink (UL) and downlink (DL) signals in a Base Station (BS) and a Remote Station (RS)
Figure 4:
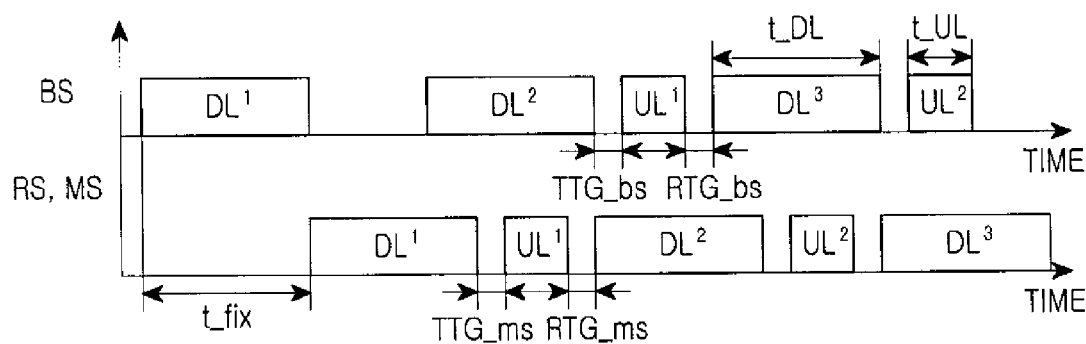
FIG. 4 illustrates a time axis signaling diagram of uplink (UL) and downlink (DL) signals in a BS and an RS according to an exemplary embodiment of the present invention.

FIG. 4 illustrates temporal data movement of UL and DL signals in a BS and an RS according to an exemplary embodiment of the present invention. The core point of the current embodiment is to adjust times t_UL (time_UpLink), t_DL (time_DownLink), TTG, and RTG so that the BS receives UL data immediately after transmitting DL data and the MS also receives DL data immediately after transmitting UL data. As illustrated in FIG. 2, a TDD-based frame in FIG. 4 is composed of a DL data frame and a UL data frame, wherein the DL data frame and the UL data frame are distinguished from each other using a TTG and an RTG for switching of transmission and reception operations. The TTG is the time required for the BS to switch from a transmission mode to a reception mode or the MS to switch from the reception mode to the transmission mode. During each TTG, each of the BS and the MS performs transmission/reception antenna switching and activation of a BS receiving end without transmitting a modulated signal. The RTG is the time required for the BS to switch from the reception mode to the transmission mode or the MS to switch from the transmission mode to the reception mode. Although it has been express herein that a same TTG and a same RTG is used to explain the principles of the present invention, it would be understood by those skilled in the art that the BS and MS may each posses an individual TTG (e.g., TTG_bs, TTG_ms) and RTG (e.g., RTG_bs, RTG_ms) that is independent of the other respective component (i.e., MS and BS).

During each RTG each of the BS and the MS performs transmission/reception antenna switching and activation of the BS receiving end without transmitting a modulated signal. As illustrated in FIG. 2, a time delay from the RS to the MS is neglected in FIG. 4 (i.e., it is assumed that the time delay between the RS and the MS can be neglected since a distance between the RS and the MS is relatively short). According to the data flow illustrated in FIG. 4, first DL data, i.e. $DL^1$, arrives at the RS and the MS after a time delay of t_fix as illustrated in FIG. 2. The MS transmits first UL data, i.e., $UT^1$, after a time delay of TTG_ms. The first UL data also arrives at the BS after the time delay of t_fix. In the current embodiment, a TDD time frame is adjusted in order to increase TDD wireless system efficiency so that the BS can receive UL data immediately after transmitting DL data and the MS can receive DL data immediately after transmitting UL data. Thus, the TDD wireless system efficiency increases by additionally transmitting and receiving data during the waiting time. In order to increase the TDD wireless system efficiency, time lengths of t_UT, t_DL, a TTG, and an RTG so that subsequent frame data can arrive during the waiting time. The MS adjusts time lengths of t_UL, TTG_ms, and RTG_ms, and the BS adjusts time lengths of t_DL, TTG_bs, and RTG_bs. Time conditions for satisfying the adjustment are represented by Equations 2 and 3.

$$TTG\_bs+RTG\_bs=TTG\_ms+RTG\_ms \qquad (2)$$

$$t\_DL+t\_UL+TTG\_bs+RTG\_ms=2\times t\_fix \qquad (3)$$

If Equations 2 and 3 are satisfied, communication in the BS is achieved in the way where $UL^1$ is received after $DL^2$ is transmitted and $UL^2$ is received after $DL^3$ is transmitted as illustrated in FIG. 4.

Figure 5:
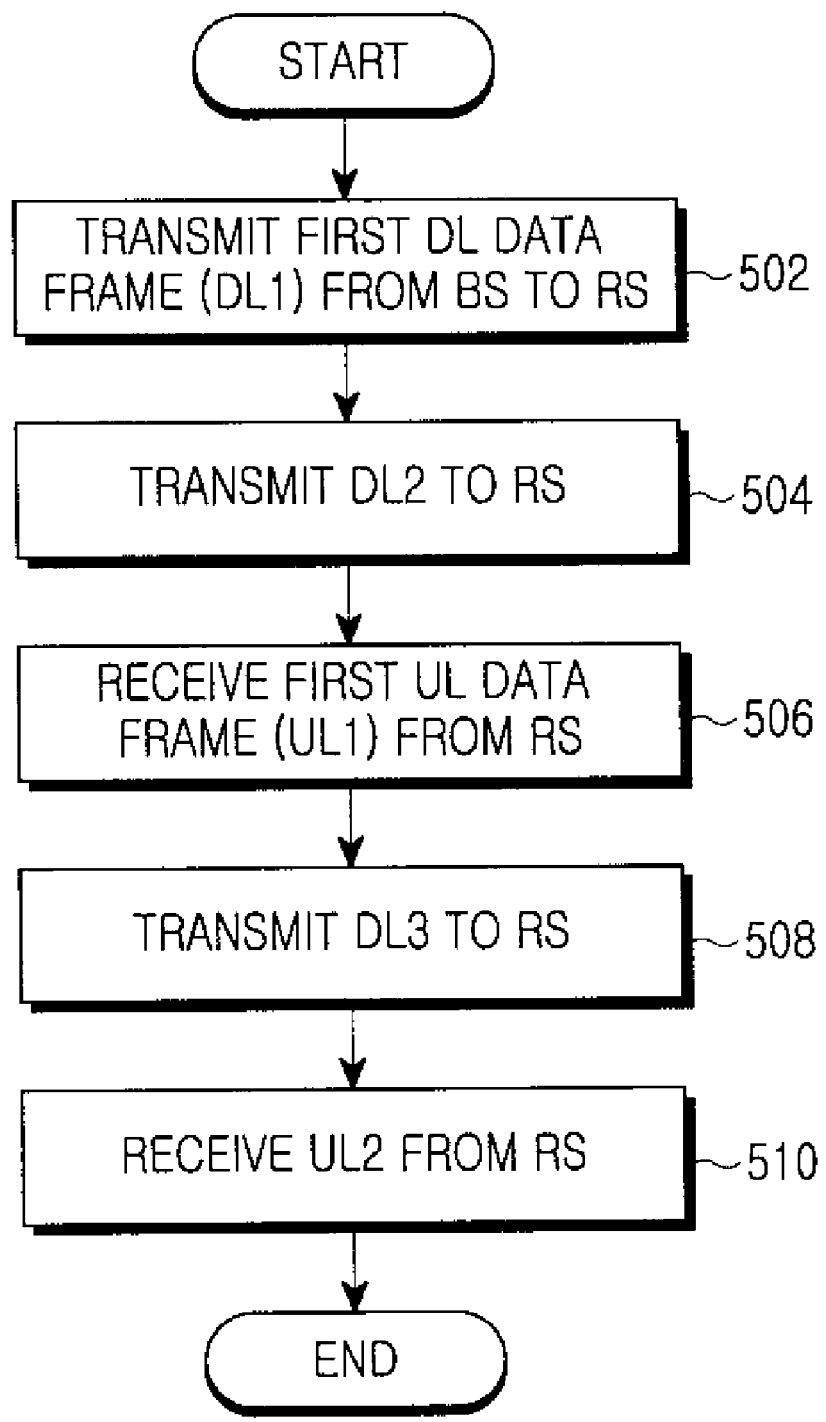
FIG. 5 is a flowchart of data transmission and reception in a BS and an RS according to an exemplary embodiment of the present invention.

FIG. 5 is a flowchart of data transmission and reception in a BS and an RS (MS) according to an exemplary embodiment of the present invention. Referring to FIG. 5, the BS transmits a specific DL data frame, i.e., $DL^1$ to the MS in step 502. While the RS receives $DL^1$ transmitted from the BS, the BS transmits $DL^2$ to the MS in step 504. If the MS transmits a UL data frame, i.e., $UL^1$, to the BS while the BS transmits $DL^2$, the BS receives $UL^1$ from the MS in step 506. While the BS receives $UL^1$, the MS receives $DL^2$, and the BS transmits $DL^3$ to the MS in step 508. While the BS transmits $DL^3$, the MS transmits $UL^2$ to the BS, and the BS receives $UL^2$ from the MS in step 510.

The method illustrated in FIG. 5 is definitely different from the conventional method illustrated in FIG. 2 in which the BS sequentially transmits $DL^1$, receives $UL^1$, transmits $DL^2$, and receives $UL^2$. However, since the MS sequentially receives $DL^1$, transmits $UL^1$, receives $DL^2$, and transmits $UL^2$, the signal transmitting and receiving sequence in the MS is equal to the conventional method.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to a certain preferred embodiment thereof, it wilt be understood by those skilled in the art that various changes in form and details may be made therein without departing from the spirit and scope of the invention as defined by the appended claims.

What is claimed is:

1. A systems for establishing a system delay time and a frame length in a Time Division Duplexing (TDD) system, the system comprising:

a main donor for generating control information used to generate a switch control signal, using a switch control frame unit when data is transmitted from an Access Point (AP) and transmitting the control information to a remote during an idle time excluding a transmission time of downlink (DL) data, wherein the control information is formulated such that downlink data of a new packet is transmitted prior to uplink data of a previous packet is received; and the remote for analyzing the control information received from the main donor, generating a switch control signal according to the analyzed control information, setting a link path according to the switch control signal, and outputting uplink (UL) and DL data.

2. The system of claim 1, wherein the main donor converts the DL data and the control information to an optical signal and transmits the optical signal to the remote, and converts an optical signal received from the remote to UL data and transmits the UL data to the AP.

3. The system of claim 1, wherein the main donor comprises a Low Noise Amplifier (LNA), a data combiner, an electro-optic conversion module, a Wavelength Division Multiplexer (WDM), an opto-electric conversion module, and a High Power Amplifier (HPA).

4. The system of claim 1, wherein the remote converts an optical signal received from the main donor to DL data and transmits the DL data to a Mobile Station (MS), and converts UL data received from the MS to an optical signal and transmits the optical signal to the main donor.

5. The system of claim 1, wherein the remote comprises a WDM, an opto-electric conversion module, a data separator, an HPA, an LNA, a switch, an electro-optic conversion module, and a switch time signal generator.

6. The system of claim 5, wherein the switch time signal generator generates a control signal for controlling the switch, the HPA, and the LNA.

7. An apparatus for establishing a system delay time and a frame length in a Time Division Duplexing (TDD) system, the apparatus comprising:

an access point in communication with a main donor, the main donor generating control information used to generate a switch control signal, and transmitting the control information during an idle time, wherein the control information is formulated such that downlink data of a new packet is transmitted prior to receiving uplink data of a previous packet.

8. The apparatus of claim 7, wherein the main donor comprises:

a Low Noise Amplifier (LNA) for low noise amplifying a signal received from the access point;

a data combiner for combining the control signal with the amplified signal;

an electro-optic conversion module for converting the combined low noise amplified signal and the control signal;

a Wavelength Division Multiplexer (WDM); and a switch time signal generator for generating a control signal.

9. The apparatus of claim 8, further comprising:

an opto-electric conversion module receiving a signal from the WDM, and a High Power Amplifier (HPA) for amplifying the received signal and providing the amplified signal to the access.

10. The apparatus of claim 8, wherein the control signal controls the LNA.

11. The apparatus of claim 10, wherein the control signal further controls the HPA.

12. The apparatus of claim 7, wherein the switch time generated control signal comprises:

synchronization information, time delay information, DL data transport time information, UL data transport time information, Transmit/receive Transition Gap (TTG) information, and Receive/transmit Transition Gap (RTG) information.

13. An apparatus for receiving a combined optical signal including data and a control signal, the apparatus comprising:

an opto-electric converted for converting the received optical signal into the data signal and the control signal;

a signal separator for separating the data signal from the control signal;

a high powered amplifier for amplifying the data signal;

a switch generator receiving the separated control signal and controlling a switch based on the contents of the separated control signal, the control signal being formulated such that downlink data of a new packet is received immediately after transmitting uplink data of a previous packet.

14. The apparatus of claim 13, further comprising:

a low noise amplifier, receiving an input from the switch; and an electro-optical converter for converting the received signal into an optical signal.

15. The apparatus of claim 13, wherein the switch time generated control signal comprises:

synchronization information, time delay information, DL data transport time information, UL data transport time information, Transmit/receive Transition Gap (TTG) information, and Receive/transmit Transition Gap (RTG) information.

* * * * *